United States Patent
Glovinski

(10) Patent No.: US 8,957,645 B2
(45) Date of Patent: Feb. 17, 2015

(54) ZERO VOLTAGE SWITCHING

(75) Inventor: Tzachi Glovinski, Petah Tikva (IL)

(73) Assignee: Solaredge Technologies Ltd., Hod Hasharon (IL)

(*) Notice: Subject to any disclaimer, the term of this patent is extended or adjusted under 35 U.S.C. 154(b) by 81 days.

(21) Appl. No.: 13/338,330

(22) Filed: Dec. 28, 2011

(65) Prior Publication Data

US 2012/0187926 A1    Jul. 26, 2012

Related U.S. Application Data

(63) Continuation of application No. 12/409,604, filed on Mar. 24, 2009, now Pat. No. 8,111,052.

(60) Provisional application No. 61/039,046, filed on Mar. 24, 2008.

(51) Int. Cl.
| | | |
|---|---|---|
| G05F 1/24 | (2006.01) | |
| H02M 1/34 | (2007.01) | |
| H02M 7/5387 | (2007.01) | |
| G05F 1/59 | (2006.01) | |
| H02M 7/48 | (2006.01) | |

(52) U.S. Cl.
CPC ............. *H02M 1/34* (2013.01); *H02M 7/5387* (2013.01); *H02M 2007/4811* (2013.01); *Y02B 70/1441* (2013.01)
USPC ............ 323/259; 323/225; 323/271; 323/288

(58) Field of Classification Search
USPC ......... 323/222, 223, 224, 225, 259, 268, 271, 323/272, 282, 344, 288
See application file for complete search history.

(56) References Cited

U.S. PATENT DOCUMENTS

| | | | |
|---|---|---|---|
| 3,369,210 A | 2/1968 | Manickella | |
| 3,596,229 A | 7/1971 | Hohorst | |
| 3,958,136 A | 5/1976 | Schroeder | |
| 4,060,757 A | 11/1977 | McMurray | |

(Continued)

FOREIGN PATENT DOCUMENTS

| | | |
|---|---|---|
| CN | 1309451 A | 8/2001 |
| DE | 19737286 A1 | 3/1999 |

(Continued)

OTHER PUBLICATIONS

Ciobotaru, et al., Control of single-stage single-phase PV inverter, Aug. 7, 2006.

(Continued)

*Primary Examiner* — Gray L Laxton
(74) *Attorney, Agent, or Firm* — Banner & Witcoff, Ltd.

(57) ABSTRACT

A method for providing non-resonant zero-voltage switching in a switching power converter. The switching power converter converts power from input power to output power during multiple periodic switching cycles. The switching power converter includes a main switch and an auxiliary capacitor adapted for connecting to the main switch, and an inductor connectible to the auxiliary capacitor. When the main switch is on, a previously charged (or previously discharged) auxiliary capacitor is connected to the main switch with auxiliary switches. The main switch is switched off with zero voltage while discharging non-resonantly (charging) the auxiliary capacitor by providing a current path to the inductor. The auxiliary capacitor is disconnected from the main switch.

19 Claims, 7 Drawing Sheets

(56) References Cited

U.S. PATENT DOCUMENTS

| | | |
|---|---|---|
| 4,101,816 A | 7/1978 | Shepter |
| 4,171,861 A | 10/1979 | Hohorst |
| 4,257,087 A | 3/1981 | Cuk |
| 4,452,867 A | 6/1984 | Conforti |
| 4,460,232 A | 7/1984 | Sotolongo |
| 4,481,654 A | 11/1984 | Daniels et al. |
| 4,554,515 A | 11/1985 | Burson et al. |
| 4,598,330 A | 7/1986 | Woodworth |
| 4,602,322 A | 7/1986 | Merrick |
| 4,623,753 A | 11/1986 | Feldman et al. |
| 4,637,677 A | 1/1987 | Barkus |
| 4,641,042 A | 2/1987 | Miyazawa |
| 4,641,079 A | 2/1987 | Kato et al. |
| 4,644,458 A | 2/1987 | Harafuji et al. |
| 4,652,770 A | 3/1987 | Kumano |
| 4,706,181 A | 11/1987 | Mercer |
| 4,720,667 A | 1/1988 | Lee et al. |
| 4,720,668 A | 1/1988 | Lee et al. |
| 4,783,728 A | 11/1988 | Hoffman |
| RE33,057 E | 9/1989 | Clegg et al. |
| 4,868,379 A | 9/1989 | West |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,910,518 A | 3/1990 | Kim et al. |
| 4,978,870 A | 12/1990 | Chen et al. |
| 4,987,360 A | 1/1991 | Thompson |
| 5,045,988 A | 9/1991 | Gritter et al. |
| 5,081,558 A | 1/1992 | Mahler |
| 5,191,519 A | 3/1993 | Kawakami |
| 5,280,232 A | 1/1994 | Kohl et al. |
| 5,287,261 A | 2/1994 | Ehsani |
| 5,327,071 A | 7/1994 | Frederick et al. |
| 5,345,375 A | 9/1994 | Mohan |
| 5,402,060 A | 3/1995 | Erisman |
| 5,446,645 A | 8/1995 | Shirahama et al. |
| 5,460,546 A | 10/1995 | Kunishi et al. |
| 5,493,154 A | 2/1996 | Smith et al. |
| 5,497,289 A | 3/1996 | Sugishima et al. |
| 5,517,378 A | 5/1996 | Asplund et al. |
| 5,530,335 A | 6/1996 | Decker et al. |
| 5,548,504 A | 8/1996 | Takehara |
| 5,604,430 A | 2/1997 | Decker et al. |
| 5,616,913 A | 4/1997 | Litterst |
| 5,644,219 A | 7/1997 | Kurokawa |
| 5,646,501 A | 7/1997 | Fishman et al. |
| 5,659,465 A | 8/1997 | Flack et al. |
| 5,686,766 A | 11/1997 | Tamechika |
| 5,748,457 A * | 5/1998 | Poon et al. .................. 363/16 |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,905,645 A | 5/1999 | Cross |
| 5,919,314 A | 7/1999 | Kim |
| 5,923,158 A | 7/1999 | Kurokami et al. |
| 5,932,994 A | 8/1999 | Jo et al. |
| 5,933,327 A | 8/1999 | Leighton et al. |
| 5,945,806 A | 8/1999 | Faulk |
| 5,949,668 A | 9/1999 | Schweighofer |
| 5,963,010 A | 10/1999 | Hayashi et al. |
| 5,990,659 A | 11/1999 | Frannhagen |
| 6,002,290 A | 12/1999 | Avery et al. |
| 6,031,736 A | 2/2000 | Takehara et al. |
| 6,037,720 A | 3/2000 | Wong et al. |
| 6,038,148 A | 3/2000 | Farrington et al. |
| 6,046,919 A | 4/2000 | Madenokouji et al. |
| 6,050,779 A | 4/2000 | Nagao et al. |
| 6,078,511 A | 6/2000 | Fasullo et al. |
| 6,081,104 A | 6/2000 | Kern |
| 6,082,122 A | 7/2000 | Madenokouji et al. |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,219,623 B1 | 4/2001 | Wills |
| 6,255,360 B1 | 7/2001 | Domschke et al. |
| 6,256,234 B1 | 7/2001 | Keeth et al. |
| 6,259,234 B1 | 7/2001 | Perol |
| 6,262,558 B1 | 7/2001 | Weinberg |
| 6,285,572 B1 | 9/2001 | Onizuka et al. |
| 6,292,379 B1 | 9/2001 | Edevold et al. |
| 6,301,128 B1 | 10/2001 | Jang et al. |
| 6,304,065 B1 * | 10/2001 | Wittenbreder ................ 323/259 |
| 6,320,769 B2 | 11/2001 | Kurokami et al. |
| 6,339,538 B1 | 1/2002 | Handleman |
| 6,351,130 B1 | 2/2002 | Preiser et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,433,522 B1 | 8/2002 | Siri |
| 6,448,489 B2 | 9/2002 | Kimura et al. |
| 6,452,814 B1 * | 9/2002 | Wittenbreder .................. 363/16 |
| 6,462,962 B1 * | 10/2002 | Cuk ................................ 363/16 |
| 6,493,246 B2 | 12/2002 | Suzui et al. |
| 6,507,176 B2 | 1/2003 | Wittenbreder, Jr. |
| 6,531,848 B1 | 3/2003 | Chitsazan et al. |
| 6,545,211 B1 | 4/2003 | Mimura |
| 6,548,205 B2 | 4/2003 | Leung et al. |
| 6,587,051 B2 | 7/2003 | Takehara et al. |
| 6,590,793 B1 | 7/2003 | Nagao et al. |
| 6,593,521 B2 | 7/2003 | Kobayashi |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,731,136 B2 | 5/2004 | Knee |
| 6,738,692 B2 | 5/2004 | Schienbein et al. |
| 6,744,643 B2 | 6/2004 | Luo et al. |
| 6,765,315 B2 | 7/2004 | Hammerstrom et al. |
| 6,768,047 B2 | 7/2004 | Chang et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,801,442 B2 | 10/2004 | Suzui et al. |
| 6,850,074 B2 | 2/2005 | Adams et al. |
| 6,882,131 B1 | 4/2005 | Takada et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 | 1/2006 | Notman |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |

(56) References Cited

U.S. PATENT DOCUMENTS

| | | | |
|---|---|---|---|
| 7,079,406 B2 | 7/2006 | Kurokami et al. | |
| 7,087,332 B2 | 8/2006 | Harris | |
| 7,090,509 B1 | 8/2006 | Gilliland et al. | |
| 7,091,707 B2 | 8/2006 | Cutler | |
| 7,097,516 B2 | 8/2006 | Werner et al. | |
| 7,126,053 B2 | 10/2006 | Kurokami et al. | |
| 7,126,294 B2 | 10/2006 | Minami et al. | |
| 7,135,847 B2 * | 11/2006 | Taurand | 323/290 |
| 7,138,786 B2 | 11/2006 | Ishigaki et al. | |
| 7,148,669 B2 | 12/2006 | Maksimovic et al. | |
| 7,158,359 B2 | 1/2007 | Bertele et al. | |
| 7,158,395 B2 | 1/2007 | Deng et al. | |
| 7,174,973 B1 | 2/2007 | Lysaght | |
| 7,193,872 B2 | 3/2007 | Siri | |
| 7,218,541 B2 | 5/2007 | Price et al. | |
| 7,248,946 B2 | 7/2007 | Bashaw et al. | |
| 7,256,566 B2 | 8/2007 | Bhavaraju et al. | |
| 7,277,304 B2 | 10/2007 | Stancu et al. | |
| 7,281,141 B2 | 10/2007 | Elkayam et al. | |
| 7,282,814 B2 | 10/2007 | Jacobs | |
| 7,291,036 B1 | 11/2007 | Daily et al. | |
| RE39,976 E | 1/2008 | Schiff et al. | |
| 7,336,056 B1 | 2/2008 | Dening | |
| 7,348,802 B2 | 3/2008 | Kasanyal et al. | |
| 7,352,154 B2 | 4/2008 | Cook | |
| 7,371,963 B2 | 5/2008 | Suenaga et al. | |
| 7,372,712 B2 | 5/2008 | Stancu et al. | |
| 7,385,380 B2 | 6/2008 | Ishigaki et al. | |
| 7,385,833 B2 | 6/2008 | Keung | |
| 7,394,237 B2 | 7/2008 | Chou et al. | |
| 7,420,815 B2 | 9/2008 | Love | |
| 7,435,134 B2 | 10/2008 | Lenox | |
| 7,435,897 B2 | 10/2008 | Russell | |
| 7,471,014 B2 | 12/2008 | Lum et al. | |
| 7,504,811 B2 * | 3/2009 | Watanabe et al. | 323/282 |
| 7,589,437 B2 | 9/2009 | Henne et al. | |
| 7,600,349 B2 | 10/2009 | Liebendorfer | |
| 7,602,080 B1 | 10/2009 | Hadar et al. | |
| 7,605,498 B2 | 10/2009 | Ledenev et al. | |
| 7,612,283 B2 | 11/2009 | Toyomura et al. | |
| 7,646,116 B2 | 1/2010 | Batarseh et al. | |
| 7,719,140 B2 | 5/2010 | Ledenev et al. | |
| 7,748,175 B2 | 7/2010 | Liebendorfer | |
| 7,759,575 B2 | 7/2010 | Jones et al. | |
| 7,763,807 B2 | 7/2010 | Richter | |
| 7,780,472 B2 | 8/2010 | Lenox | |
| 7,782,031 B2 | 8/2010 | Qiu et al. | |
| 7,783,389 B2 | 8/2010 | Yamada et al. | |
| 7,787,273 B2 | 8/2010 | Lu et al. | |
| 7,804,282 B2 | 9/2010 | Bertele | |
| 7,812,701 B2 | 10/2010 | Lee et al. | |
| 7,839,022 B2 | 11/2010 | Wolfs | |
| 7,843,085 B2 | 11/2010 | Ledenev et al. | |
| 7,864,497 B2 | 1/2011 | Quardt et al. | |
| 7,868,599 B2 | 1/2011 | Rahman et al. | |
| 7,880,334 B2 | 2/2011 | Evans et al. | |
| 7,893,346 B2 | 2/2011 | Nachamkin et al. | |
| 7,900,361 B2 | 3/2011 | Adest et al. | |
| 7,919,952 B1 | 4/2011 | Fahrenbruch | |
| 7,919,953 B2 | 4/2011 | Porter et al. | |
| 7,925,552 B2 | 4/2011 | Tarbell et al. | |
| 7,944,191 B2 | 5/2011 | Xu | |
| 7,948,221 B2 | 5/2011 | Watanabe et al. | |
| 7,952,897 B2 | 5/2011 | Nocentini et al. | |
| 7,960,650 B2 | 6/2011 | Richter et al. | |
| 7,960,950 B2 | 6/2011 | Glovinsky | |
| 8,003,885 B2 | 8/2011 | Richter et al. | |
| 8,004,116 B2 | 8/2011 | Ledenev et al. | |
| 8,004,117 B2 | 8/2011 | Adest et al. | |
| 8,013,472 B2 | 9/2011 | Adest et al. | |
| 8,058,747 B2 | 11/2011 | Avrutsky et al. | |
| 8,058,752 B2 | 11/2011 | Erickson, Jr. et al. | |
| 8,077,437 B2 | 12/2011 | Mumtaz et al. | |
| 8,093,756 B2 | 1/2012 | Porter et al. | |
| 8,093,757 B2 | 1/2012 | Wolfs | |
| 8,098,055 B2 | 1/2012 | Avrutsky et al. | |
| 8,102,144 B2 | 1/2012 | Capp et al. | |
| 8,111,052 B2 * | 2/2012 | Glovinsky | 323/225 |
| 8,116,103 B2 | 2/2012 | Zacharias et al. | |
| 8,138,914 B2 | 3/2012 | Wong et al. | |
| 8,204,709 B2 | 6/2012 | Presher, Jr. et al. | |
| 8,289,742 B2 | 10/2012 | Adest et al. | |
| 8,415,937 B2 | 4/2013 | Hester | |
| 8,436,592 B2 | 5/2013 | Saitoh | |
| 2001/0023703 A1 | 9/2001 | Kondo et al. | |
| 2001/0034982 A1 | 11/2001 | Nagao et al. | |
| 2002/0044473 A1 | 4/2002 | Toyomura et al. | |
| 2002/0056089 A1 | 5/2002 | Houston | |
| 2003/0058593 A1 | 3/2003 | Bertele et al. | |
| 2003/0066076 A1 | 4/2003 | Minahan | |
| 2003/0075211 A1 | 4/2003 | Makita et al. | |
| 2003/0080741 A1 | 5/2003 | LeRow et al. | |
| 2003/0214274 A1 | 11/2003 | Lethellier | |
| 2004/0041548 A1 | 3/2004 | Perry | |
| 2004/0061527 A1 | 4/2004 | Knee | |
| 2004/0125618 A1 | 7/2004 | De Rooij et al. | |
| 2004/0140719 A1 | 7/2004 | Vulih et al. | |
| 2004/0169499 A1 | 9/2004 | Huang et al. | |
| 2004/0201279 A1 | 10/2004 | Templeton | |
| 2004/0201933 A1 | 10/2004 | Blanc | |
| 2004/0246226 A1 | 12/2004 | Moon | |
| 2005/0002214 A1 | 1/2005 | Deng et al. | |
| 2005/0005785 A1 | 1/2005 | Poss et al. | |
| 2005/0017697 A1 | 1/2005 | Capel | |
| 2005/0057214 A1 | 3/2005 | Matan | |
| 2005/0057215 A1 | 3/2005 | Matan | |
| 2005/0068820 A1 | 3/2005 | Radosevich et al. | |
| 2005/0099138 A1 | 5/2005 | Wilhelm | |
| 2005/0103376 A1 | 5/2005 | Matsushita et al. | |
| 2005/0105224 A1 | 5/2005 | Nishi | |
| 2005/0121067 A1 | 6/2005 | Toyomura et al. | |
| 2005/0162018 A1 | 7/2005 | Realmuto et al. | |
| 2005/0172995 A1 | 8/2005 | Rohrig et al. | |
| 2005/0226017 A1 | 10/2005 | Kotsopoulos et al. | |
| 2005/0281064 A1 | 12/2005 | Olsen et al. | |
| 2006/0001406 A1 | 1/2006 | Matan | |
| 2006/0017327 A1 | 1/2006 | Siri et al. | |
| 2006/0034106 A1 | 2/2006 | Johnson | |
| 2006/0038692 A1 | 2/2006 | Schnetker | |
| 2006/0053447 A1 | 3/2006 | Krzyzanowski et al. | |
| 2006/0066349 A1 | 3/2006 | Murakami | |
| 2006/0068239 A1 | 3/2006 | Norimatsu et al. | |
| 2006/0108979 A1 | 5/2006 | Daniel et al. | |
| 2006/0113843 A1 | 6/2006 | Beveridge | |
| 2006/0113979 A1 | 6/2006 | Ishigaki et al. | |
| 2006/0118162 A1 | 6/2006 | Saelzer et al. | |
| 2006/0132102 A1 | 6/2006 | Harvey | |
| 2006/0149396 A1 | 7/2006 | Templeton | |
| 2006/0162772 A1 | 7/2006 | Presher et al. | |
| 2006/0163946 A1 | 7/2006 | Henne et al. | |
| 2006/0171182 A1 | 8/2006 | Siri et al. | |
| 2006/0174939 A1 | 8/2006 | Matan | |
| 2006/0185727 A1 | 8/2006 | Matan | |
| 2006/0192540 A1 | 8/2006 | Balakrishnan et al. | |
| 2006/0208660 A1 | 9/2006 | Shinmura et al. | |
| 2006/0227578 A1 | 10/2006 | Datta et al. | |
| 2006/0237058 A1 | 10/2006 | McClintock et al. | |
| 2007/0013349 A1 | 1/2007 | Bassett | |
| 2007/0044837 A1 | 3/2007 | Simburger et al. | |
| 2007/0075689 A1 | 4/2007 | Kinder et al. | |
| 2007/0075711 A1 | 4/2007 | Blanc et al. | |
| 2007/0081364 A1 | 4/2007 | Andreycak | |
| 2007/0147075 A1 | 6/2007 | Bang | |
| 2007/0159866 A1 | 7/2007 | Siri | |
| 2007/0164612 A1 | 7/2007 | Wendt et al. | |
| 2007/0164750 A1 | 7/2007 | Chen et al. | |
| 2007/0165347 A1 | 7/2007 | Wendt et al. | |
| 2007/0205778 A1 | 9/2007 | Fabbro et al. | |
| 2007/0227574 A1 | 10/2007 | Cart | |
| 2007/0236187 A1 | 10/2007 | Wai et al. | |
| 2007/0247877 A1 | 10/2007 | Kwon et al. | |
| 2007/0273342 A1 | 11/2007 | Kataoka et al. | |
| 2007/0290636 A1 | 12/2007 | Beck et al. | |
| 2008/0024098 A1 | 1/2008 | Hojo | |

(56) References Cited

U.S. PATENT DOCUMENTS

| | | |
|---|---|---|
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0218152 A1 | 9/2008 | Bo |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0303503 A1 | 12/2008 | Wolfs |
| 2009/0039852 A1 | 2/2009 | Fishelov et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0184746 A1 | 7/2009 | Fahrenbruch |
| 2009/0190275 A1 | 7/2009 | Gilmore et al. |
| 2009/0206666 A1 | 8/2009 | Sella et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0273241 A1 | 11/2009 | Gazit et al. |
| 2009/0282755 A1 | 11/2009 | Abbott et al. |
| 2009/0284998 A1 | 11/2009 | Zhang et al. |
| 2009/0322494 A1 | 12/2009 | Lee |
| 2010/0001587 A1 | 1/2010 | Casey et al. |
| 2010/0052735 A1 | 3/2010 | Burkland et al. |
| 2010/0085670 A1 | 4/2010 | Palaniswami et al. |
| 2010/0127571 A1 | 5/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0037600 A1 | 2/2011 | Takehara et al. |
| 2011/0043172 A1 | 2/2011 | Dearn |
| 2011/0079263 A1 | 4/2011 | Avrutsky |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0125431 A1 | 5/2011 | Adest et al. |
| 2011/0140536 A1 | 6/2011 | Adest et al. |
| 2011/0181251 A1 | 7/2011 | Porter et al. |
| 2011/0210611 A1 | 9/2011 | Ledenev et al. |
| 2011/0254372 A1 | 10/2011 | Haines et al. |
| 2011/0260866 A1 | 10/2011 | Avrutsky et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0007613 A1 | 1/2012 | Gazit |
| 2012/0019966 A1 | 1/2012 | DeBoer |
| 2012/0032515 A1 | 2/2012 | Ledenev et al. |
| 2012/0081009 A1 | 4/2012 | Shteynberg et al. |
| 2012/0091810 A1 | 4/2012 | Aiello et al. |

FOREIGN PATENT DOCUMENTS

| | | |
|---|---|---|
| DE | 102005030907 A1 | 1/2007 |
| DE | 102008057874 A1 | 5/2010 |
| EP | 419093 A2 | 3/1991 |
| EP | 420295 A1 | 4/1991 |
| EP | 604777 A1 | 7/1994 |
| EP | 756178 A2 | 1/1997 |
| EP | 827254 A2 | 3/1998 |
| EP | 1039621 A2 | 9/2000 |
| EP | 1330009 A2 | 7/2003 |
| EP | 1503490 A1 | 2/2005 |
| EP | 1531542 A2 | 5/2005 |
| EP | 1531545 A2 | 5/2005 |
| EP | 1657557 A1 | 5/2006 |
| EP | 1657797 A1 | 5/2006 |
| EP | 1887675 A2 | 2/2008 |
| EP | 2048679 A1 | 4/2009 |
| EP | 2315328 A2 | 4/2011 |
| EP | 2393178 A2 | 12/2011 |
| ES | 2249147 A1 | 3/2006 |
| ES | 2249149 A1 | 3/2006 |
| GB | 2476508 A | 6/2011 |
| JP | 61065320 A | 4/1986 |
| JP | 8009557 A | 1/1996 |
| JP | 11041832 A | 2/1999 |
| JP | 11103538 A | 4/1999 |
| JP | 11206038 A | 7/1999 |
| JP | 11289891 A | 10/1999 |
| JP | 11318042 A | 11/1999 |
| JP | 2000339044 A | 12/2000 |
| JP | 2002300735 A | 10/2002 |
| JP | 2003124492 A | 4/2003 |
| JP | 2003134667 A | 5/2003 |
| JP | 2004194500 A | 7/2004 |
| JP | 2004260944 A | 9/2004 |
| JP | 2004334704 A | 11/2004 |
| JP | 2005192314 A | 7/2005 |
| JP | 2007058845 A | 3/2007 |
| WO | 9313587 A1 | 7/1993 |
| WO | 9613093 A1 | 5/1996 |
| WO | 9823021 A2 | 5/1998 |
| WO | 00/00839 A1 | 1/2000 |
| WO | 00/21178 A1 | 4/2000 |
| WO | 0075947 A1 | 12/2000 |
| WO | 0231517 | 4/2002 |
| WO | 03050938 A2 | 6/2003 |
| WO | 03071655 A1 | 8/2003 |
| WO | 2004023278 A2 | 3/2004 |
| WO | 2004090993 A2 | 10/2004 |
| WO | 2004107543 A2 | 12/2004 |
| WO | 2005076444 A1 | 8/2005 |
| WO | 2005076445 A1 | 8/2005 |
| WO | 2006005125 A1 | 1/2006 |
| WO | 2006007198 A1 | 1/2006 |
| WO | 2006078685 A2 | 7/2006 |
| WO | 2007006564 A2 | 1/2007 |
| WO | 2007048421 A2 | 5/2007 |
| WO | 2007073951 A1 | 7/2007 |
| WO | 2007084196 A2 | 7/2007 |
| WO | 2007090476 A2 | 8/2007 |
| WO | 2007113358 A1 | 10/2007 |
| WO | 2008008528 A2 | 1/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009046533 A1 | 4/2009 |
| WO | 2009051853 A1 | 4/2009 |

(56) References Cited

FOREIGN PATENT DOCUMENTS

| WO | 2010/002960 A1 | 1/2010 |
|---|---|---|
| WO | 2010065388 A1 | 6/2010 |
| WO | 2010072717 A1 | 7/2010 |
| WO | 2010078303 A2 | 7/2010 |
| WO | 2010094012 A1 | 8/2010 |
| WO | 2011011711 A2 | 1/2011 |
| WO | 2011017721 A1 | 2/2011 |
| WO | 2011023732 A2 | 3/2011 |
| WO | 2011059067 A1 | 5/2011 |
| WO | 2011074025 A1 | 6/2011 |

OTHER PUBLICATIONS

International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Converence, Feb. 2001, Colorado Power Electronics Center Publications.
Chen, et al., "Buck-Boost PWM Converters Having Two Independently Controlled Switches", IEEE Power Electronics Specialists Converence, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.
Geoffrey R. Walker Affidavit re: U.S. Appl. No. 11/950,307, submitted in an IDS for U.S. Appl. No. 11/950,271 on Mar. 9, 2010.
Geoffrey R. Walker Affidavit re: U.S. Appl. No. 11/950,271, submitted in an IDS for U.S. Appl. No. 11/950,271 on Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solor Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Matsui, et al., "A New Maximum Photovoltaic Power Tracking Control Scheme Based on Power Equilibrium at DC Link", IEEE, 1999, pp. 804-809.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18 (3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and the National Electrical

(56) References Cited

OTHER PUBLICATIONS

Code: Suggested Practices", by John Wiles, Southwest Technology Development Instutte New Mexico State University Las Cruces, NM.

United Kingdom Intellectual Property Office, Combined Search and Examination Report Under Sections 17 and 18(3), GB1020862.7, dated Jun. 16, 2011.

QT Technical Application Papers, "ABB Circuit-Breakers for Direct current Applications", ABB SACE S.p.A., An ABB Group Coupany, L.V. Breakers, Via Baioni, 35, 24123 Bergamo-Italy, Tel.: +39 035.395.111—Telefax: +39 035.395.306-433, Sep. 2007.

Woyte, et al., "Mains Monitoring and Protection in a European Context", 17th European Photovoltaic Solar Energy Conference and Exhibition, Munich, Germany, Oct. 22-26, 2001, ACHIM, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. OH Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

IPRP for PCT/IB2007/004584 dated Jun. 10, 2009, with Written Opinion.

IPRP for PCT/IB2007/004591 dated Jul. 13, 2010, with Written Opinion.

IPRP for PCT/IB2007/004643 dated Jun. 10, 2009, with Written Opinion.

Written Opinion for PCT/IB2008/055092 submitted with IPRP dated Jun. 8, 2010.

IPRP for PCT/US2008/085754 dated Jun. 8, 2010, with Written Opinion dated Jan. 21, 2009.

IPRP for PCT/US2008/085755 dated Jun. 8, 2010, with Written Opinion dated Jan. 20, 2009.

IPRP for PCT/IB2009/051221 dated Sep. 28, 2010, with Written Opinion.

IPRP for PCT/IB2009/051222 dated Sep. 28, 2010, with Written Opinion.

IPRP for PCT/IB2009/051831 dated Nov. 9, 2010, with Written Opinion.

IPRP for PCT/US2008/085736 dated Jun. 7, 2011, with Written Opinion.

IPRP for PCT/IB2010/052287 dated Nov. 22, 2011, with Written Opinion.

ISR for PCT/IB2010/052413 dated Sep. 7, 2010.

UK Intellectual Property Office, Application No. GB1109618.7, Patents Act 1977, Examination Report Under Section 18(3), Sep. 16, 2011.

UK Intellectual Property Office, Patents Act 1977: Patents Rules Notification of Grant: Patent Serial No. GB2480015, Nov. 29, 2011.

Walker, et al. "PV String Per-Module Maximim Power Point Enabling Converters", School of Information Technology and Electrical Engineering The Univiversity of Queensland, Sep. 28, 2003.

Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.

Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.

Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.

Duarte, "A Family of ZVX-PWM Active-Chlamping DC-to-DC Converters: Symnthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.

IPRP for PCT/IL2007/001064 dated Mar. 17, 2009, with Written Opinion dated Mar. 25, 2008.

IPRP for PCT/IB2007/004586 dated Jun. 10, 2009, with Written Opinion.

Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.

IPRP PCT/IB2007/004610—date of issue Jun. 10, 2009.

Extended European Search Report—EP12176089.6—Mailing date: Nov. 8, 2012.

Gwon-Jong Yu et al: "Maximum power point tracking with temperature compensation of photovoltaic for air conditioning system with fuzzy controller", 19960513; 19960513—19960517, May 13, 1996, pp. 1429-1432, XP010208423.

Extended European Search Report—EP12177067.1—Mailing Date: Dec. 7, 2012.

GB Combined Search and Examination Report—GB1200423.0—Mailing date: Apr. 30, 2012.

GB Combined Search and Examination Report—GB1201499.9—Mailing date: May 28, 2012.

GB Combined Search and Examination Report—GB1201506.1—Mailing date: May 22, 2012.

Extended European Search Report—EP 08878650.4—Mailing date: Mar. 28, 2013.

"Study of Energy Storage Capacitor Reduction for Single Phase PWM Rectifier", Ruxi Wang et al., Virginia Polytechnic Institute and State University, Feb. 2009.

"Multilevel Inverters: A Survey of Topologies, Controls, and Applications", Jose Rodriguez et al., IEEE Transactions on Industrial Electronics, vol. 49, No. 4, Aug. 2002.

Satcon Solstice—Satcon Solstice 100 kW System Solution Sheet—2010.

John Xue, "PV Module Series String Balancing Converters", University of Queensland—School of Infroamtion Technology & Electrical Engineering, Nov. 6, 2002.

Robert W. Erickson, "Future of Power Electronics for Photovoltaics", IEEE Applied Power Electronics Conference, Feb. 2009.

Office Action—JP 2011-539491—Mailing date: Mar. 26, 2013.

Mohammad Reza Amini et al., "Quasi REsonant DC Link Inverter with a Simple Auxiliary Circuit", Journal of Power Electronics, vol. 11, No. 1, Jan. 2011.

(56) References Cited

OTHER PUBLICATIONS

Khairy Fathy et al., "A Novel Quasi-Resonant Snubber-Assisted ZCS-PWM DC-DC Converter with High Frequency Link", Journal of Power Electronics, vol. 7, No. 2, Apr. 2007.

Cheng K.W.E., "New Generation of Switched Capacitor Converters", Department of Electrical Engineering, The Hong Kong Polytechnic University, Hung Horn, Hong Kong, Power Electronics Conference, 1998, PESC 98.

Per Karlsson, "Quasi Resonant DC Link Converters—Analysis and Design for a Battery Charger Application", Universitetstryckeriet, Lund University, 1999, ISBN 91-88934-14-4.

Hsiao Sung-Hsin et al., "ZCS Switched-Capacitor Bidirectional Converters with Secondary Output Power Amplifier for Biomedical Applications", Power Electronics Conference (IPEC) Jun. 21, 2010.

Yuang-Shung Lee et al., "A Novel QR ZCS Switched-Capacitor Bidirectional Converter", IEEE, 2007.

Antti Tolvanen et al., "Seminar on Solar Simulation Standards and Measurement Principles", May 9, 2006 Hawaii.

J.A. Eikelboom and M.J. Jansen, "Characterisation of PV Modules of New Generations—Results of tests and simulations", Jun. 2000.

Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.

C. Liu et al., "Advanced Algorithm for MPPT Control of Photovoltaic Systems", Canadian Solar Buildings Conference, Montreal, Aug. 20-24, 2004.

Chihchiang Hua and Chihming Shen, "Study of Maximum Power Tracking Techniques and Control of DC/DC Converters for Photovoltaic Power System", IEEE 1998.

Tore Skjellnes et al., "Load sharing for parallel inverters without communication", Nordic Workshop in Power and Industrial Electronics, Aug. 12-14, 2002.

Giorgio Spiazzi at el., "A New Family of Zero-Current-Switching Variable Frequency dc-dc Converters", IEEE 2000.

Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.

Ph. Strauss et al., "AC coupled PV Hybrid systems and Micro Grids-state of the art and future trends", 3rd World Conference on Photovoltaic Energy Conversion, Osaka, Japan May 11-18, 2003.

Nayar, C.V., abstract, Power Engineering Society Summer Meeting, 2000. IEEE, 2000, pp. 1280-1282 vol. 2.

D. C. Martins et al., "Analysis of Utility Interactive Photovoltaic Generation System using a Single Power Static Inverter", Asian J. Energy Environ., vol. 5, Issue 2, (2004), pp. 115-137.

Rafael C. Beltrame et al., "Decentralized Multi String PV System With Integrated ZVT Cell", Congresso Brasileiro de Automática / 12 a 16-setembro-2010, Bonito-MS.

Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.

Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.

\* cited by examiner $Q_1$ on, $Q_2$ off, $Q_3$ on, $Q_4$ off (Buck Phase)

$Q_1$ off, $Q_2$ on, $Q_3$ off, $Q_4$ on (Boost phase)

ZERO VOLTAGE SWITCHING

CROSS REFERENCE TO RELATED APPLICATIONS

The present application is a continuation application of pending U.S. patent application Ser. No. 12/409,604 filed on Mar. 24, 2009 which claims priority to U.S. Provisional Application No. 61/039,046 filed on Mar. 24, 2008.

The present application claims priority from US provisional application 61/039046 filed on Mar. 24, 2008 by the present inventors.

BACKGROUND

1. Technical Field

The present invention relates to switching converters and to specifically a method and devices for zero voltage switching for reducing switching losses in switching converters.

2. Description of Related Art

FIG. 1 shows a typical conventional buck-boost DC-to-DC converter circuit 20. The buck circuit of buck-boost DC-to-DC converter 20 has an input voltage $V_{in}$ with an input capacitor $C_1$ connected in parallel across $V_{in}$. Two switches are implemented as field effect transistors (FET) with integral diodes: a high side buck switch $Q_1$ and a low side buck switch Q2 connected in series by connecting the source of $Q_1$ to the drain of $Q_2$. The drain of $Q_1$ and the source of $Q_2$ are connected parallel across an input capacitor $C_1$. A node A is formed between switches $Q_1$ and $Q_2$ to which one end of an inductor 206 is connected. The other end of inductor 206 is connected to the boost circuit of buck-boost DC-to-DC converter 20 at a node B. Node B connects two switches: a high side boost switch $Q_4$ and a low side boost switch $Q_3$ together in series where the source of $Q_4$ connects to the drain of $Q_3$ to form node B. The drain of $Q_4$ and the source of Q3 connect across an output capacitor $C_2$ to produce the output voltage $V_{out}$ of buck-boost DC-to-DC converter 20.

FIG. 2a illustrates the buck phase or on-state circuit of DC-to-DC converter circuit 20 shown in FIG. 1, the input voltage source $V_{in}$ is directly connected to inductor 206 and the load is isolated from $V_{in}$ because $Q_1$ is on, $Q_2$ is off, $Q_3$ is on and $Q_4$ is off. These switch positions: $Q_1$ on, $Q_2$ off, $Q_3$ on and $Q_4$ off; result in accumulating energy in inductor 206 since source $V_{in}$ is directly connected to inductor 206. In the on-state, output capacitor $C_2$ supplies energy to the load.

FIG. 2b illustrates the boost phase or off-state circuit of DC-to-DC converter circuit 20, Inductor 206 is connected in parallel across the load and capacitor $C_2$ because $Q_1$ is off, $Q_2$ is on, $Q_3$ is off and $Q_4$ is on. $Q_1$ being off isolates inductor 206 from the input voltage $(V_{in})$ and capacitor $(C_1)$. The stored energy in inductor 206 (as a result of the previous On-state) is transferred from inductor 206 to $C_2$ and the load.

Two common methods of operating DC-to-DC converter circuit 20 are in either continuous mode or discontinuous mode. If the current through the inductor 206 never falls to zero during a commutation cycle (i.e. the time period to perform both the on-state and the off-state), DC-to-DC converter circuit 20 is said to operate in continuous mode and typically the on-state operates for a shorter period of time when compared to the off-state. Discontinuous mode of operation for DC to DC converter circuit 20 occurs when the amount of energy required by the load is small enough to be transferred in a time period smaller than the whole commutation cycle. Typically, the current through inductor 206 falls to zero for a short time period after the off-state period and therefore inductor 206 is completely discharged at the end of the commutation cycle. The commutation cycle therefore includes the on-state, the off-state and the short time period during which the inductor current is zero.

A conventional "resonant" method for achieving virtually zero power loss when switching a switch is to apply a direct current voltage input voltage $V_{in}$ across a switch (with a diode connected across the switch, the diode is reverse biased with respect to $V_{in}$) in series with an inductor L and a capacitor C. The output voltage of the circuit is derived across the capacitor. The output voltage of the circuit could then in principle be connected to the input of a power converter, for example a buck-loaded series tank circuit with load. The resonant frequency of the series inductor L and capacitor C is given by Eq. 1 and the corresponding resonant periodic time T given in Eq. 2.

$$f_o = 1/2\pi(LC)^{1/2} \qquad \text{Eq.1}$$

$$T = 1/f_o \qquad \text{Eq.2}$$

A pulse response of the circuit means that when the switch turns on, there is both zero current in the inductor and zero voltage across the capacitor (Power=Volts×Current=0× 0=zero power loss at turn on). During steady state operation of the circuit, the inductor current and capacitor voltage are sinusoidal and have a 90 degrees phase shift with respect to each other. When the switch turns off (the on period of the switch corresponds to half of the resonant periodic time) there is zero current in the inductor and maximum positive voltage (i.e. $V_{capacitor} = V_{in}$) across the capacitor (Power=Volts× Current=$V_{in}$×0=zero power loss at turn off).

BRIEF SUMMARY

According to an embodiment of the present invention there is provided a method for providing non-resonant zero-voltage switching in a switching power converter. The switching power converter converts power from input power to output power during multiple periodic switching cycles. The switching power converter includes a main switch and an auxiliary capacitor adapted for connecting to the main switch, and an inductor connectible to the auxiliary capacitor. When the main switch is on, a previously charged (or previously discharged) auxiliary capacitor is connected to the main switch with auxiliary switches. The main switch is switched off with zero voltage while discharging non-resonantly (charging) the auxiliary capacitor by providing a current path to the inductor. The auxiliary capacitor is disconnected from the main switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. The switch may include a: silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), diode for alternating current (DIAC), and/or triode for alternating current TRIAC.

According to the present invention there is provided a switching converter including a buck stage and/or a boost stage including a main switch connecting an input voltage terminal to a first node; an auxiliary capacitor adapted for connecting to the main switch and an inductor adapted for connecting to the first node. The first node is connectible to the auxiliary capacitor by at least two current paths. When the main switch is on, a previously charged (or previously discharged) auxiliary capacitor is connected across the main switch typically with auxiliary switches. The main switch is switched off with zero voltage while discharging (charging) the auxiliary capacitor by providing a current path to the inductor. The auxiliary capacitor is disconnected from the switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. The switching converter may include a single buck stage or a single boost stage.

According to the present invention there is provided a switching converter included a plurality of main switches interconnected in a full bridge topology, the main switches including a first switch, a second switch, a third switch and a fourth switch,. A pair of input voltage terminals are attachable at a first node connecting the first and third switches and at a second node connecting the second and fourth switches. A first output voltage terminal is operatively attached at a third node connecting the third and fourth switches. A second output voltage terminal is operatively attached at a fourth node connecting the first and second switches. Bidirectional switches are interconnected in a full bridge topology. The bidirectional switches include a first bidirectional switch, a second bidirectional switch, a third bidirectional switch and a fourth bidirectional switch. The third node connects the first and third bidirectional switches and the fourth node connects the second and fourth bidirectional switches. An auxiliary capacitor connects at one end at a node connecting the first and second bidirectional switches and at the other end at a node connecting the second and fourth bidirectional switches. The main switches are preferably configured to be periodically switched on and off during a plurality of switching cycles. One or more of the main switches is on. A previously charged (or previously discharged) auxiliary capacitor is connected across the main switch typically with auxiliary switches. The main switch is switched off with zero voltage while discharging (charging) the auxiliary capacitor by providing a current path to the inductor. The auxiliary capacitor is disconnected from the switch. The voltage of the auxiliary capacitor is charged and discharged alternatively during subsequent switching cycles. The voltage of the auxiliary capacitor stays substantially the same until the subsequent turn off of the main switch during the next switching cycle with substantially no energy loss in the auxiliary capacitor. A first inductor is typically attachable between the first output voltage terminal and the third node. A second inductor is typically attachable between the second output voltage terminal and the fourth node. The first and second inductor is optionally a single split inductor or inductor is a single inductor connected in series to a transformer primary or other circuitry.

BRIEF DESCRIPTION OF THE DRAWINGS

The invention is herein described, by way of example only, with reference to the accompanying drawings, wherein.

Figure 1:
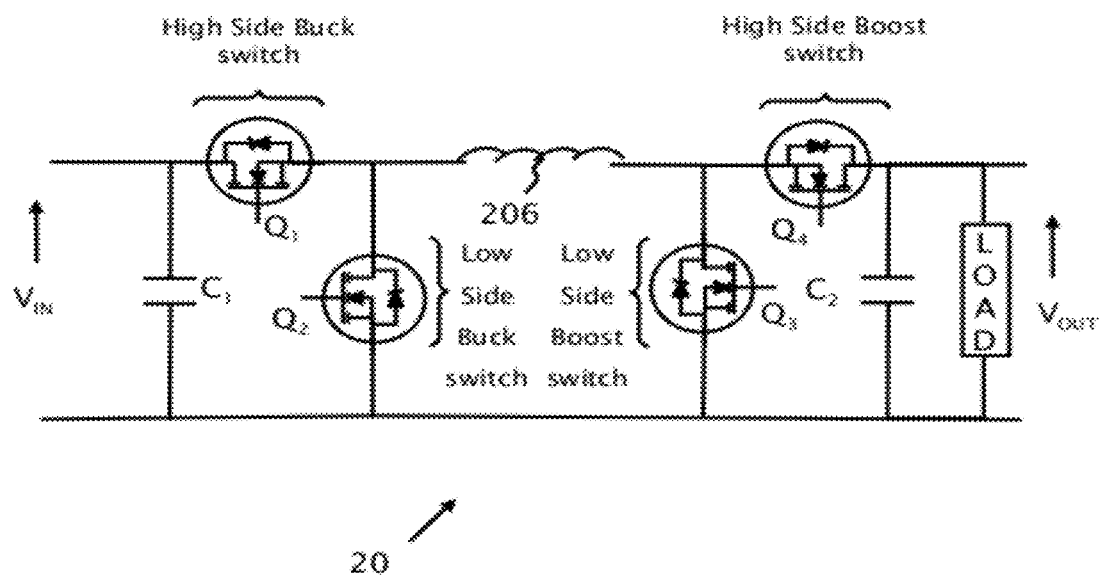
FIG. 1 shows a typical conventional buck-boost DC-to-DC converter circuit.
Figure 2A:
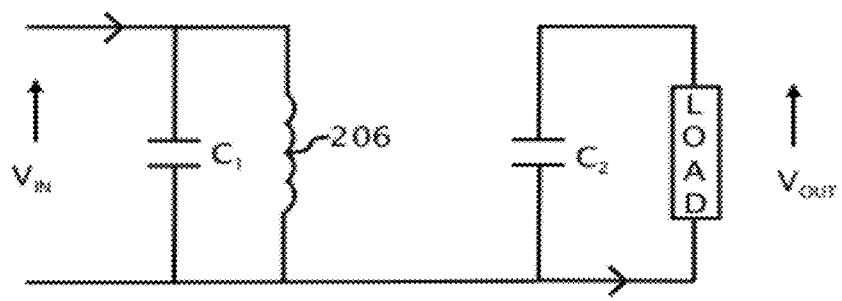
FIG. 2a illustrates the buck phase or on-state circuit of conventional DC-to-DC converter circuit.
Figure 2B:
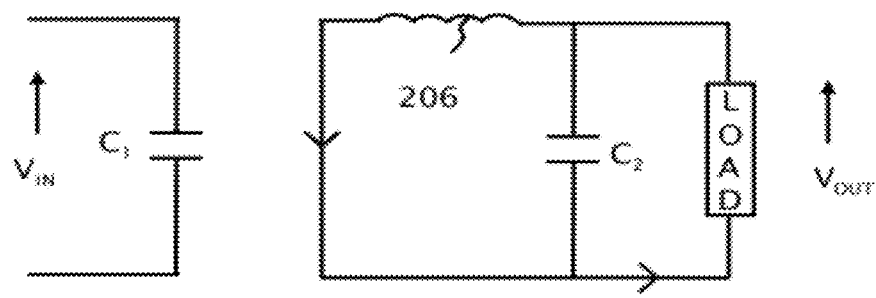
FIG. 2b illustrates the boost phase or off-state circuit of DC-to-DC converter circuit 20.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

It should be noted, that although the discussion herein relates to buck, boost, buck-boost full bridge switching topologies, the present invention may, by non-limiting example, alternatively be configured as well using other types of switching power DC-DC converters including half bridge, flyback, Cuk, as well as DC-AC inverters for both power supply and regulation applications.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The term "switch" as used herein refers to any type of switch known in the art of electronics switches such as silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), DIAC, and TRIAC.

The term "zero voltage switching" (or "ZVS") as used herein is that the peak voltage across a switch, is reduced to substantially zero volts when the switch is being turned either on or off.

The term "cycle" or "commutation cycle" refers to the periodicity of main switch positions in a circuit which performs a process of electrical power conversion or inversion.

The term "power converter" as used herein applies to DC-to-DC converters, AC-to-DC converters, DC-to-AC inverters, buck converters, boost converters, buck-boost converters, buck/boost converters, full-bridge converters and half-bridge converters or any other type of electrical power conversion/inversion known in the art.

The term "buck-boost" converter as used herein refers to a buck converter followed by a boost converter.

The term "non-resonant" as used herein to exclude resonant and quasi-resonant circuits and methods as are known in the prior art for achieving zero voltage switching.

The terms "charging" and "discharging" in the context of the present invention in reference to charging and discharging a capacitor, are used herein interchangeably except that current flow while charging and discharging is usually in the opposite direction.

Reference is now made to FIG. 3 (FIGS. 3a-3d) showing a buck-boost DC-to-DC converter 40 according to an embodiment of the present invention. A buck circuit 42 of buck-boost DC-to-DC converter 40 has an input voltage $V_{in}$ with an input capacitor $C_1$ connected in parallel across $V_{in}$. Two switches $Q_1$ and $Q_2$ are connected in series at node A by connecting the source of $Q_1$ to the drain of $Q_2$. The drain of $Q_1$ and the source of $Q_2$ are placed in parallel across capacitor $C_1$. A zero-voltage switching feature according to embodiments of the present invention is provided using components: switches $Q_{bu}$, $Q_{abu}$, auxiliary (AUX) capacitor $C_{bu}$, and diodes $D_{2bu}$ and $D_{abu}$ in buck circuit 42. The cathode of diode $D_{2bu}$ is connected to one end of capacitor $C_{bu}$. The other end of $C_{bu}$ is connected to the drain of switch $Q_{bu}$. The drain of $Q_{abu}$ and the anode of diode $D_{2bu}$ are connected in parallel across capacitor $C_1$. The cathode of diode $D_{abu}$ is connected to the source of switch $Q_{bu}$. The anode of diode $D_{abu}$ and the source of switch $Q_{abu}$ are connected across with capacitor $C_{bu}$. Node A shared by the cathode of diode $D_{abu}$ and the source of switch $Q_{bu}$ is connected to the buck end of inductor 206.

The other end of inductor 206 is connected to a boost circuit 44 of buck boost DC-to-DC converter 40 at node B. Two switches $Q_4$ and $Q_3$ are connected in series. The source of $Q_4$ connects to the drain of $Q_3$ at node B. The drain of $Q_4$ and the source of $Q_3$ connect across capacitor $C_2$, across capacitor $C_2$ is the output voltage $V_{out}$ of buck-boost DC-to-DC converter 40. Additional components: switches $Q_{bo}$, $Q_{abo}$, auxiliary (AUX) capacitor $C_{bo}$, and diodes $D_{1bo}$, $D_{abo}$ are added to achieve zero-voltage switching in boost circuit 44. The anode of diode $D_{1bo}$ is connected to one end of capacitor $C_{bo}$. The other end of $C_{bo}$ is connected to the source of switch $Q_{bo}$ and the drain of $Q_{abo}$. The source of $Q_{abo}$ and the cathode of diode $D_{1bo}$ are connected in parallel across capacitor $C_2$. The anode of diode $D_{abo}$ is connected to the drain of switch $Q_{bo}$. The node between the anode of diode $D_{abo}$ and the drain of switch $Q_3$ are connected to node B. The cathode of diode $D_{abo}$ and the source of switch $Q_{bo}$ are connected across with capacitor $C_{bo}$.

Figure 3A:
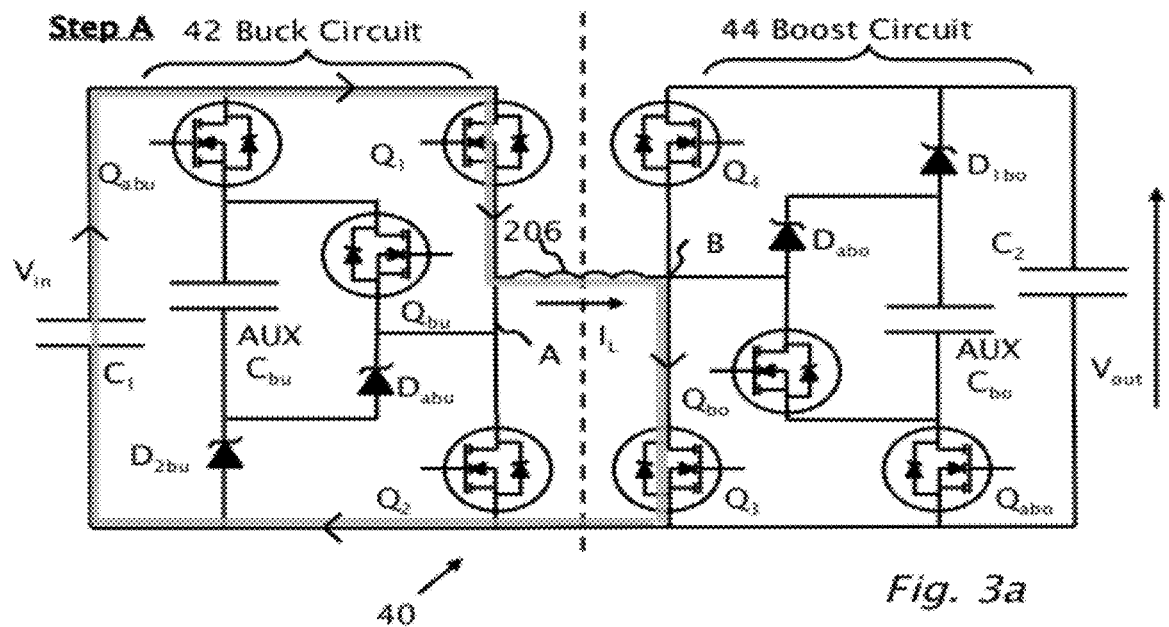
FIG. 3 (FIGS. 3a-3d) illustrate a buck-boost DC-to-DC converter, according to an embodiment of the present invention.
Figure 3B:
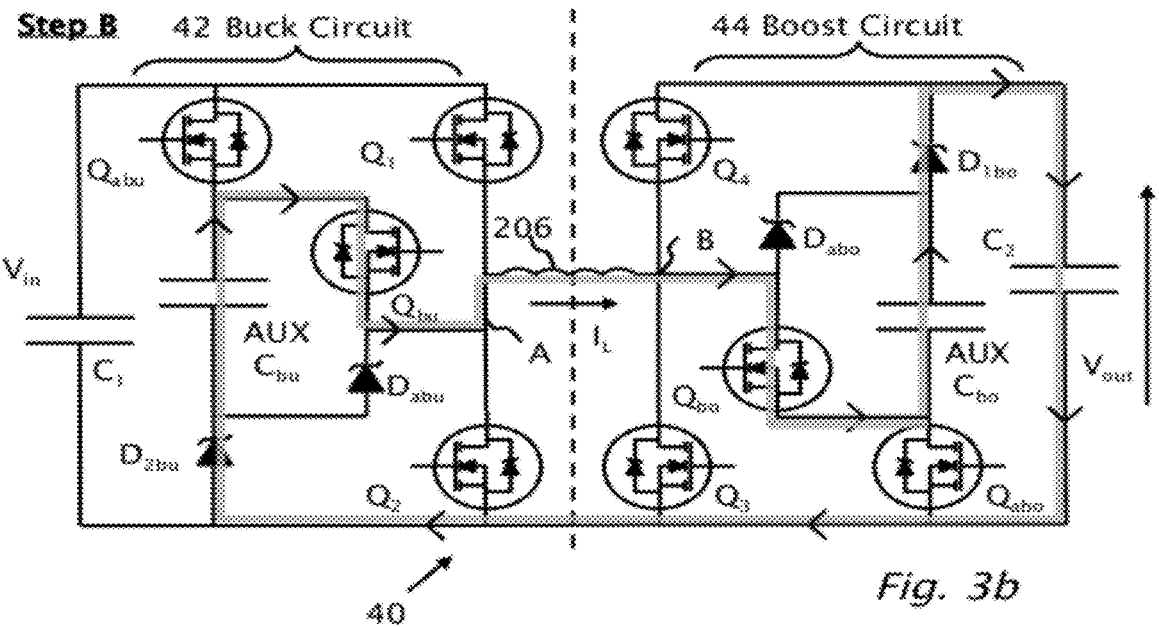
Figure 3C:
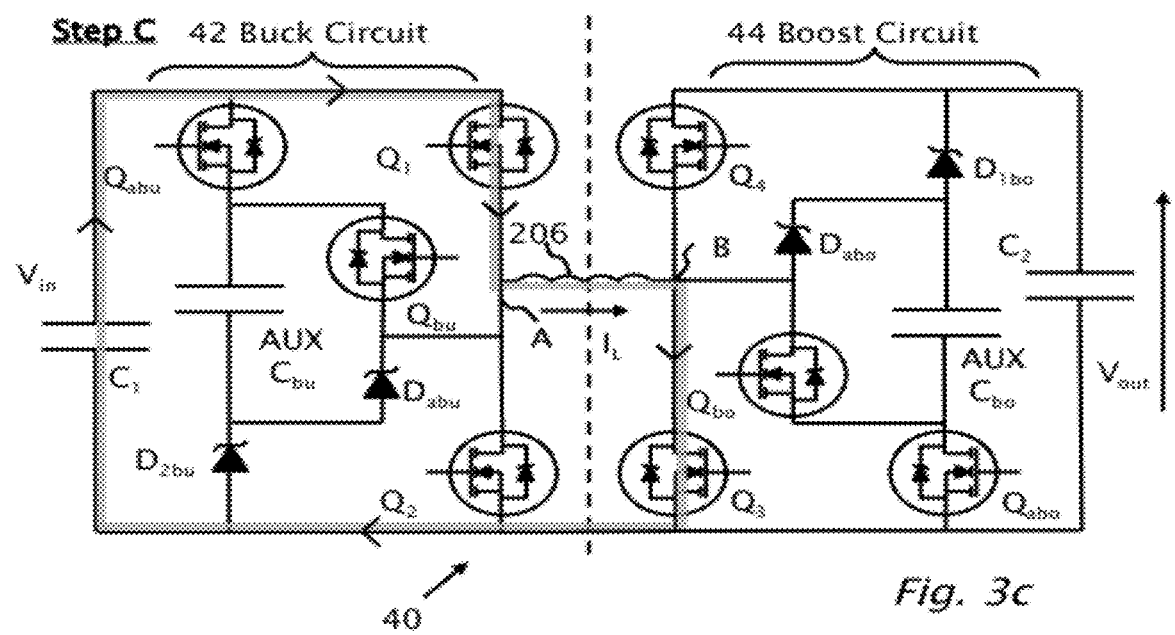
Figure 3D:
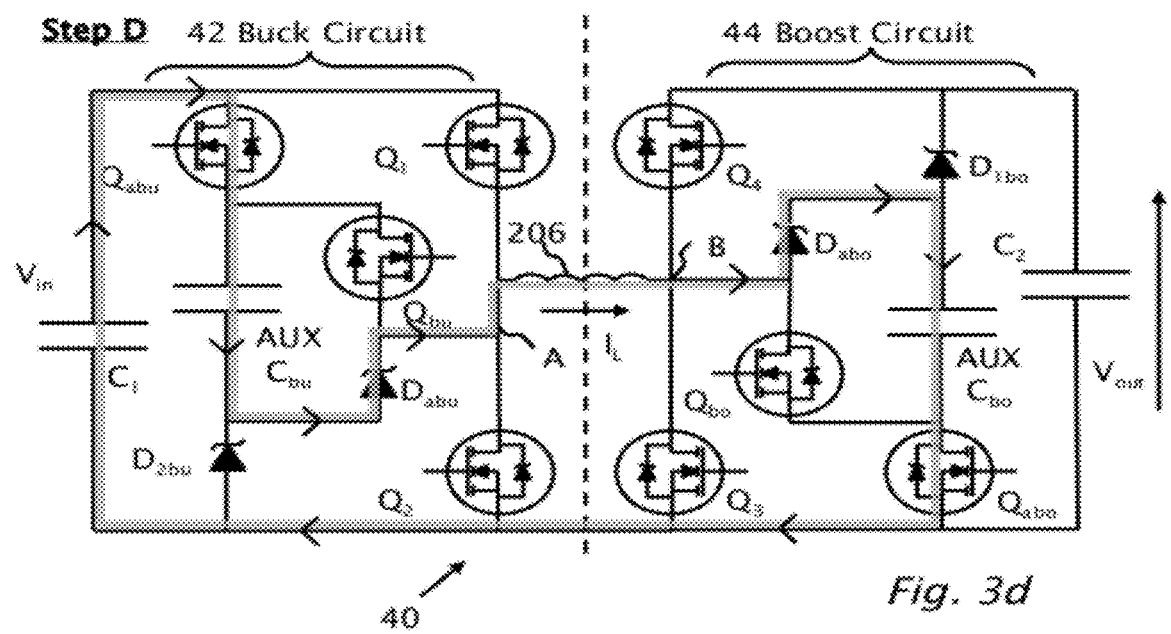
Figure 4:
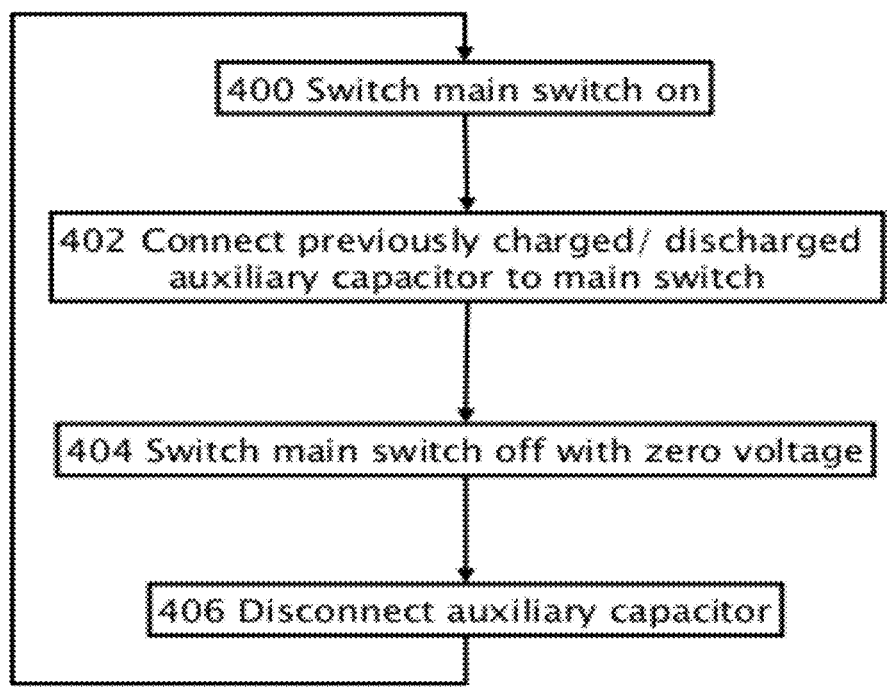
FIG. 4 shows a flow diagram of a method for zero voltage switching, running in either continuous or discontinuous mode during the turn off of main switches $Q_1$ and/or $Q_3$, according to embodiments of the present invention.

Reference is still made to buck-boost DC-to-DC converter 40 shown in FIGS. 3a-3d which illustrate operation of buck-boost DC-to-DC converter 40. Reference is now also made to FIG. 4 showing a flow diagram of a method for zero voltage switching, in boost and/or buck topologies during the turn off of main switches $Q_1$ and/or $Q_3$, according to embodiments of the present invention.

Step A. Before switching phase: In FIG. 3a, current flow in buck circuit 42 and boost circuit 44 is indicated by arrow markings and gray shaded line. In buck circuit 42, switch $Q_1$ is on (step 400), switch $Q_2$ is off and switch $Q_{bu}$ is on. Auxiliary (AUX) capacitor $C_{bu}$ is previously charged to $V_{in}$ and connected to the source of $Q_1$ (step 402). $I_L$ current flows from input, through $Q_1$ through node A to inductor 206.

Meanwhile, in boost circuit, $Q_3$ is on, $Q_4$ is off, $Q_{bo}$ is on. $C_{bo}$ is previously charged to $V_{out}$. $I_L$ current flows from inductor 206 through node B.

Step B. Switching off phase: In FIG. 3b, current flow in buck circuit 42 and boost circuit 44 is indicated by the arrow markings and gray shaded lines. Switch $Q_1$ turns off at substantially zero voltage (step 404). Switch $Q_{bu}$ is still on. $I_L$ current (of inductor 206) discharges capacitor $C_{bu}$ to zero voltage through node A through diode $D_{2bu}$. $Q_2$ turns on and $Q_{bu}$ turns off disconnecting (step 406) auxiliary (AUX) capacitor $C_{bu}$.

Meanwhile, in boost circuit 44 $Q_3$ turns off at substantially zero voltage. $I_L$ current (of inductor 206) discharges capacitor $C_{bo}$ to zero voltage through node B through diode $D_{1bo}$. Q4 turns on and $Q_{bo}$ turns off disconnecting auxiliary (AUX) capacitor $C_{bo}$.

Thus ends one switching cycle. Now, for the next switching cycle:

Step C. Before switching phase: In FIG. 3c current flow in buck circuit 42 and boost circuit 44 is indicated by the arrow markings and Grey shaded line. Switch $Q_1$ is on, Switch $Q_2$ is off (step 400). Switch $Q_{abu}$ turns on. $C_{bu}$ remains discharged from the previous switching cycle and still connected to the source of $Q_1$ (step 402). $I_L$ current flows from input through node A, through $Q_1$ to inductor 206.

Meanwhile in boost circuit 44: $Q_3$ is on, $Q_4$ is off, $Q_{abo}$ turns on. $C_{bo}$ remains discharged from the previous switching cycle.

Step D. Switching off phase: In FIG. 3d, current flow in buck circuit 42 and boost circuit 44 is indicated by the arrow markings and Grey shaded line. Switch $Q_1$ turns off with substantially zero voltage (step 404). Switch $Q_{abu}$ is still on. IL current (of inductor 206) charges capacitor Cbu to Vin voltage through node A through diode Dabu. Switch Q2 turns on. Qabu is turned off and auxiliary (AUX) capacitor $C_{bu}$ disconnected from the source of $Q_1$(step 406).

Meanwhile in the boost circuit 44, $Q_3$ turns off at substantially zero voltage. $I_L$ current (of inductor 206) charges capacitor $C_{bo}$ to $V_{out}$ voltage through node B through diode $D_{abo}$. Q4 turns on and $Q_{abo}$ turns off.

Thus ends the second switching cycle. Now, for the next switching cycle the sequence starts again at Step A.

Figure 5:
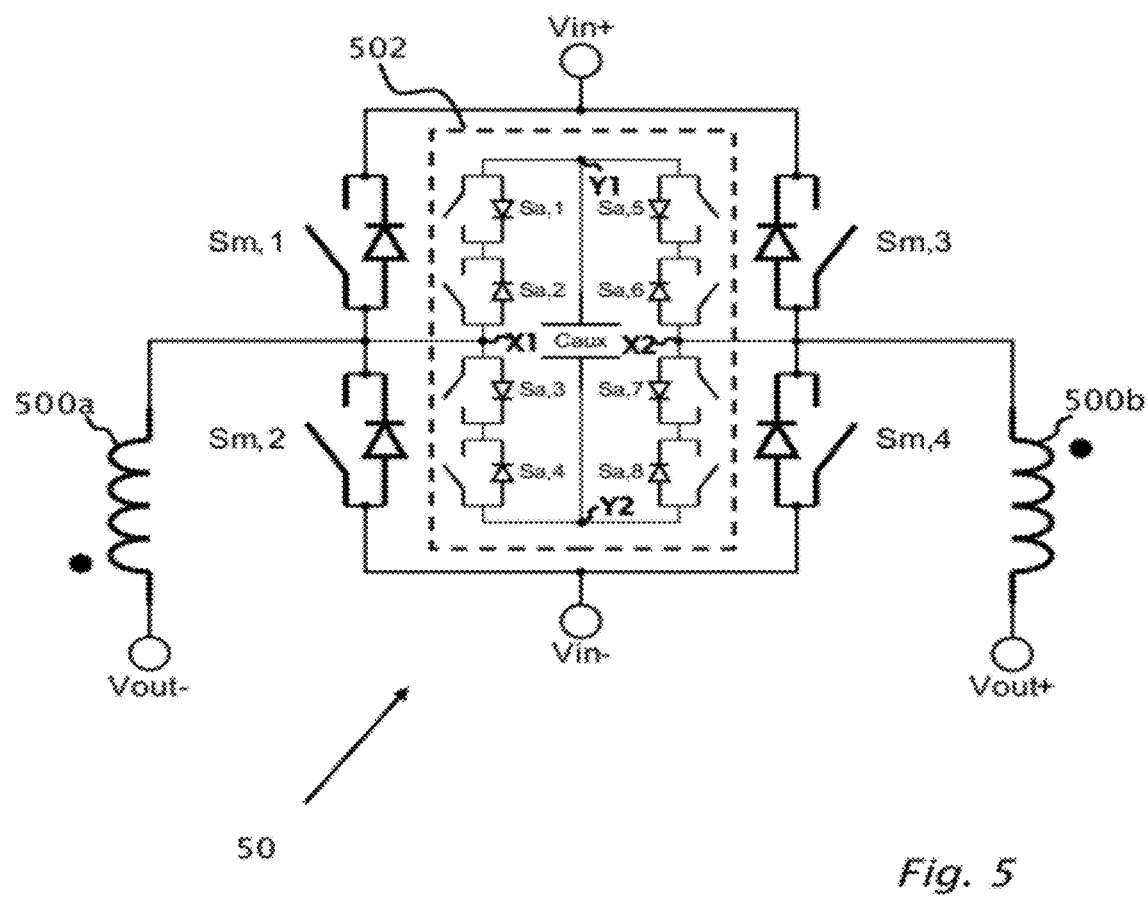
FIG. 5 shows another embodiment of present invention as applied to a full bridge switched DC-to-DC converter.

FIG. 5 shows a further embodiment of present invention as applied to a full bridge DC to DC converter 50. Full bridge DC to DC converter 50 has four main switches $S_{m,1}$, $S_{m,2}$, $S_{m,3}$ and $S_{m,4}$ connected together in a full bridge configuration. Each of the four main switches ($S_{m,1}$, $S_{m,2}$, $S_{m,3}$ and $S_{m,4}$ ) have respective diode shunts connected in parallel thereto. The diodes placed across switches $S_{m,1}$ and $S_{m,2}$ are in both the same direction similarly the diodes of $S_{m,3}$ and $S_{m,4}$ are both in the same direction. All diodes connected across switches $S_{m,1}$, $S_{m,2}$, $S_{m,3}$ and $S_{m,4}$ are reverse biased with respect to the input voltage $V_{in}$. An input voltage ($V_{in}^-$) of full bridge DC-to-DC converter 50 is connected across the node between switches $S_{m,2}$ and $S_{m,4}$ and an input voltage ($V_{in}^+$) is connected at the node between switches $S_{m,1}$ and $S_{m,3}$. An output voltage ($V_{out}^-$) of full bridge DC-to-DC converter 50 is connected across the node between switches $S_{m,1}$ and $S_{m,2}$ connected through a split inductor 500a and output voltage $V_{out}^+$ is connected at the node between switches $S_{m,3}$ and $S_{m,4}$ through a split inductor 500b . A bi-directional switch unit 502 25 includes four bidirectional switches. Each bidirectional switch includes has two switches in series, e.g. ($S_{a,1}$, $S_{a,2}$) each with a diode connected across each switch with the diodes connected in opposite directions. Bi-directional switch unit 502 is connected at X1 to the node between switches $S_{m,1}$ and $S_{m,2}$ and at X2 to the node between switches $S_{m,3}$ and $S_{m,4}$. Bidirectional auxiliary switches are formed between nodes Y1 and X1 using switches $S_{a,1}$ and $S_{a,2}$, between nodes Y1 and X2 using switches $S_{a,5}$ and $S_{a,6}$, between nodes Y2 and X1 using switches $S_{a,3}$ and $S_{a,4}$ and between nodes Y2 and X2 using switches $S_{a,7}$ and $S_{a,8}$. An auxiliary capacitor $C_{aux}$ is connected between nodes Y1 and Y2.

Figure 6:
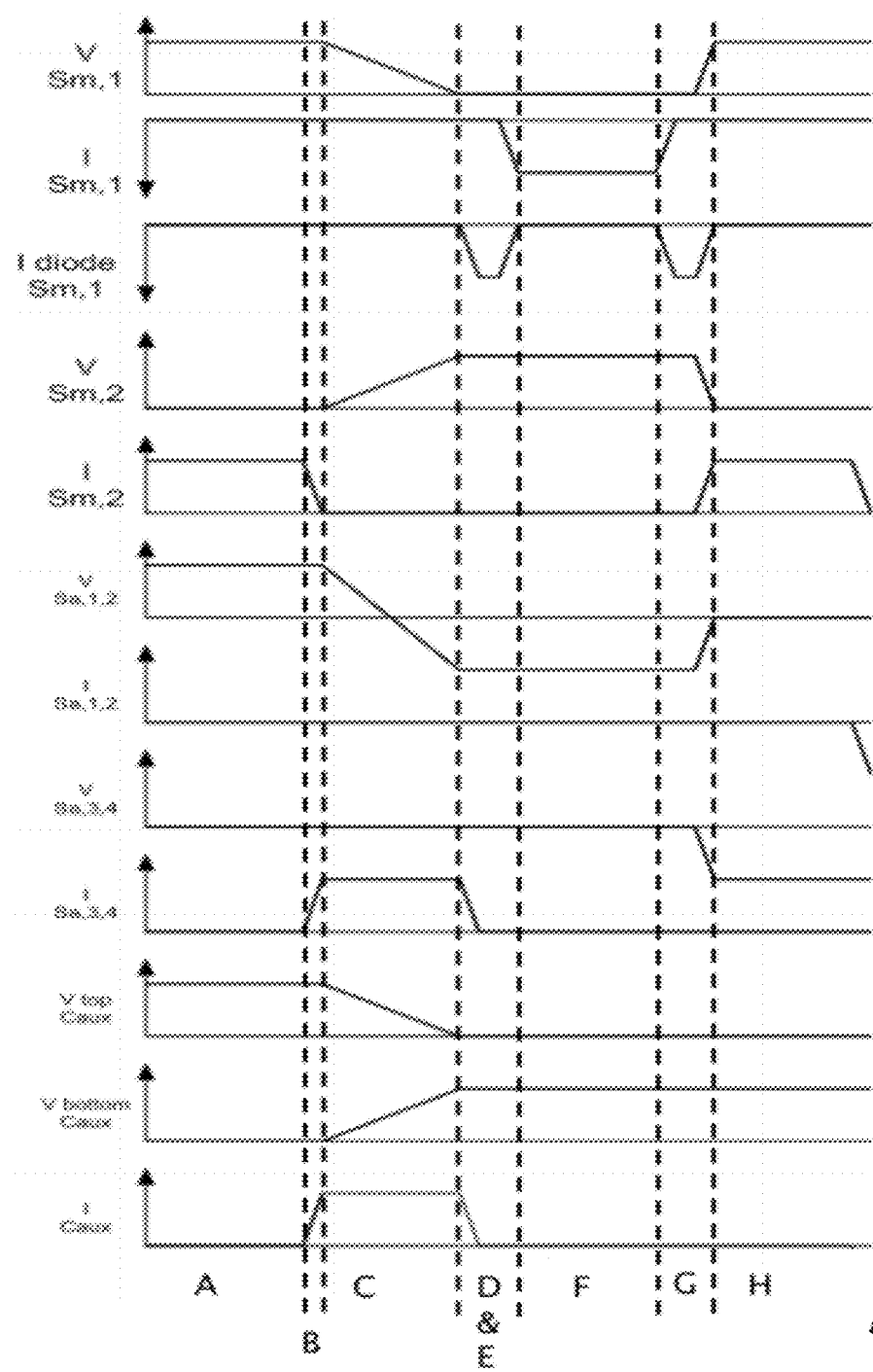
FIG. 6 shows a timing diagram of selected voltages and currents in the embodiment of FIG. 5.

In different embodiments the present invention may be configured to operate in either continuous or discontinuous current mode. The operation of full bridge circuit 50, according to a feature of the present invention and with reference again to FIG. 5 and FIG. 6 which shows a timing diagram of selected voltages and currents for steps A to H is as follows:

A) Switches $S_{m,2}$, $S_{m,3}$ $S_{a,3}$, $S_{a,4}$, $S_{a,5}$, and $S_{a,6}$ are turned on, all other switches are off. Current flows from $V_{out}^-$ to $V_{in}^-$ through inductor 500a, and through main switch $S_{m,2}$. Current flows from $V_{in}^+$ to $V_{out}^+$ through $S_{m,3}$ and through inductor 500b. Capacitor $C_{aux}$ is charged so that node Y1 approaches $V_{in}^+$ and node Y2 approaches $V_{in}^-$.

B) $S_{m,2}$ and $S_{m,3}$ are switched open (off). Switches $S_{a,3}$, $S_{a,4}$, $S_{a,5}$, and $S_{a,6}$ remain on. During the switching open of $S_{m,2}$ and $S_{m,3}$ current from inductor 500a and 500b is diverted respectively through bidirectional switches ($S_{a,3}$ $S_{a,4}$) and ($S_{a,5}$ $S_{a,6}$) with voltage across switches $S_{m,2}$ and $S_{m,3}$ substantially zero. All inductor current flows through $C_{aux}$ from node Y2 to node Y1 which during a period of time dependent on the current in inductors 500a and 500b and the capacitance of $C_{aux}$ inverts the voltage across $C_{aux}$ so that node Y1 is charged to a voltage level equal to $V_{in}^-$ and node Y2 is charged to a voltage level equal to $V_{in}^+$ via auxiliary capacitor $C_{aux}$ C and D) Once $C_{aux}$ is fully charged and inverted, node Y1 is charged to $V_{in}^-$ and Y2 is charged to $V_{in}^+$, current now flows from $V_{out}^-$ through inductor 500a through parallel connected diode of $S_{m,1}$ and current flows from $V_{in}^-$ through the parallel connected diode of $S_{m,4}$, and through inductor 500b to $V_{out}^+$.

E) Auxiliary switches $S_{a,3}$, $S_{a,4}$, $S_{a,5}$, and $S_{a,6}$ are now turned off with no current flowing through them nor a voltage across them.

F) Main switches $S_{m,1}$ and $S_{m,4}$ are turned on with substantially zero voltage across them, diverting most of the current from flowing through their parallel connected diodes to flowing through switches $S_{m,1}$ and $S_{m,4}$ themselves.

G) Before the turn on of Sm,2 and Sm,3, main switches Sm,1 and Sm,4 are turned off with zero voltage across them so that current flow is diverted again through their parallel connected diodes.

H) Main switches $S_{m,2}$ and $S_{m,3}$ turn on to begin the next switching cycle. Current of inductor 500a flows from $V_{out}^-$ through inductor 500a, through switch $S_{m,2}$ to $V_{in}^-$; and current of inductor 500b flows from $V_{in}^+$ through $S_{m,3}$ to $V_{out}^+$.

I) Auxiliary switches $S_{a,1}$, $S_{a,2}$, $S_{a,7}$ and $S_{a,8}$ are turned on with zero voltage and zero current.

J) $S_{m,2}$ and $S_{m,3}$ open at zero voltage. All inductor current flows now through from $V_{out}^-$ through inductor 500a, through bidirectional switch ($S_{a,1}$,$S_{a,2}$), through $C_{aux}$, through bidirectional switch ($S_{a,1}$,$S_{a,2}$) from node Y1 to node Y2 which over a period of time (dependent on the current in inductors 500a and 500b and the capacitance of $C_{aux}$) inverts again the voltage across $C_{aux}$ so that node Y1 is charged to a voltage level equal to $V_{in}^+$ and node Y2 is charged to a voltage level equal to $V_{in}^-$ (as it was in (1)).

K) Current flows from $V_{out}^-$ through inductor 500a, through the parallel connected diode of $S_{m,1}$ to $V_{in}^+$. Current flows from $V_{in}^-$ through the parallel connected diode of $S_{m,4}$ and through inductor 500b to $V_{out}^+$.

L) Auxiliary switches $S_{a,1}$, $S_{a,2}$, $S_{a,7}$, and $S_{a,8}$ are turned off with zero voltage and zero current.

M) Main switches $S_{m,1}$ and $S_{m,4}$ are turned on at zero voltage forcing the current through themselves from $V_{out}^-$ through inductor 500a, through $S_{m,1}$, and from $V_{in}^-$ through $S_{m,4}$ and through inductor 500b to $V_{out}$+.

N) Before $S_{m,2}$ and $S_{m,3}$ are turned on, main switches $S_{m,1}$ and $S_{m,4}$ are turned off with zero voltage, the current flowing again from $V_{out}^-$ through inductor 500a, through the diode of $S_{m,1}$, through $V_{in}$+ and from $V_{in}^-$ through the diode of $S_{m,4}$ and through inductor 500b to $V_{out}$+.

O) Main switches $S_{m,2}$ and $S_{m,3}$ turn on to begin the next switching cycle. The current flows again from $V_{out}^-$ through inductor 500a, through $S_{m,2}$ to $V_{in}^-$ and from $V_{in}^+$, through $S_{m,3}$ and through inductor 500b to $V_{out}^+$.

P) $S_{a,3}$, $S_{a,4}$, $S_{a,5}$, and $S_{a\ 6}$ are turned on with zero voltage and zero current.

During the two switching cycles as shown, auxiliary capacitor $C_{aux}$ is charged and discharged by the inductor current with substantially no energy loss due to switching.

The definite articles "a", "an" is used herein, such as "a converter", "a switch" have the meaning of "one or more" that is "one or more converters" or "one or more switches".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method comprising:
   transferring energy from an input through a first switch to an inductor thereby storing the energy on the inductor during first phases of respective periodic switching cycles of a power converter;
   transferring the energy stored on the inductor through a second switch to an output during second phases of the respective periodic switching cycles;
   zero volt switching off the first switch at a beginning of a transition from the first shale to the second phase of each respective periodic switching cycle;
   zero volt switching on the second switch at an end of the transition from the first phase to the second phase of each respective periodic switching cycle; and
   discharging or charging an auxiliary capacitor via a current path through the inductor while the first and second switches are off during the transition from the first phase to the second phase of each respective periodic switching cycle.

2. The method according to claim 1, wherein the first and second switches are each selected from the group consisting of: a silicon controlled rectifier (SCR), an insulated gate bipolar junction transistor (IGBT), a bipolar junction transistor (BJT), a field effect transistor (FET), a junction field effect transistor (JFET), a switching diode, an electrical relay, a reed relay, a solid state relay, an insulated gate field effect transistor (IGFET), a diode for alternating current (DIAC), and a triode for alternating current TRIAC.

3. The method of claim 1, wherein the discharging or charging of the auxiliary capacitor shifts a voltage on a node connecting the first and second switches and the inductor from a zero voltage level of the first switch to a zero voltage level of the second switch.

4. The method of claim 1, wherein the discharging or charging further comprising:
   alternatively charging and discharging the capacitor during respective subsequent cycles of the periodic switching cycles.

5. The method of claim 4, further comprising:
   closing a first switched current path loop through the capacitor, the inductor and the output during the discharging;
   closing a second switched current path loop through the capacitor, the inductor and the input during the charging.

6. The method of claim 1, wherein the charging and discharging are non-resonant.

7. A switching converter comprising:
   first and second switches, an auxiliary capacitor circuit, an inductor, an input, and an output; wherein:
   the first and second switches are connected to a first node of the inductor;

said first switch is configured to transfer energy to the inductor from the input during first phases of respective periodic switching cycles;

the second switch is configured to transfer the energy from the inductor to the output during second phases of the respective periodic switching cycles;

the auxiliary capacitor circuit includes a capacitor and at least one auxiliary switch that closes a current path through the capacitor and the inductor; and the auxiliary capacitor circuit is configured to change a voltage at the first node such that the first and second switches are zero voltage switched at different times during transitions between the first and second phases.

8. The switching converter of claim 7, further comprising a buck stage that includes the first and second switches.

9. The switching converter of claim 7, further comprising a boost stage that includes the first and second switches.

10. The switching converter of claim 7, wherein the auxiliary capacitor circuit is configured to provide a current path to the first node through a capacitor while the first and second switches are simultaneously open during the transitions from the first phases to the second phases.

11. The switching converter of claim 10, wherein the auxiliary capacitor circuit is configured to provide the current path to the first node by alternatively charging and discharging the capacitor during respective alternating sequential cycles of the periodic switching cycles.

12. The switching converter of claim 11, wherein the auxiliary capacitor circuit completes a first switched path through the capacitor, inductor and output during the discharging and a second switched path through the capacitor, inductor and input during the charging.

13. The switching converter of claim 11, wherein the charging and discharging are non-resonant.

14. The switching converter of claim 7, wherein, during the transitions between the first and second phases, the first switch zero voltage switches from on to off and the second switch zero voltage switches from off to on.

15. The switching converter of claim 7 further comprising:
a buck stage that includes the first and second switches;
a boost stage that includes third and fourth switches; and
a second auxiliary capacitor circuit, wherein the third and fourth switches and the second auxiliary capacitor circuit are connected to a second node of the inductor;
wherein said third switch is configured to transfer energy to the inductor from a converter input during the first phases, the fourth switch is configured to transfer the energy from the inductor to a converter output during the second phases, and the second auxiliary capacitor circuit is configured to change a voltage at the second node such that the third and fourth switches are zero voltage switched at different times during the transitions between the first and second phases.

16. A switching converter comprising:
an input; an output; an inductor; first and second switches connected to a node of the inductor; and an auxiliary capacitor; wherein the switching converter is configured to:

during first phases of respective periodic switching cycles, transfer energy from the input through the first switch in an on state to the inductor thereby storing the energy on the inductor, and isolate the inductor from the output through the second switch in an off state;

during respective second phases of the respective periodic switching cycles, transferring the stored energy from the inductor through the second switch in an on state to the output, and isolate the inductor from the input through the first switch in an off state;

zero volt switch off the first switch at a beginning of a transition from the first phase to the second phase of each respective periodic switching cycle;

zero volt switch on the second switch at an end of the transition from the first phase to the second phase of each respective periodic switching cycle; and discharge or charge the auxiliary capacitor via a current path through the inductor while the first and second switches are off during the transition from the first phase to the second phase of each respective periodic switching cycle.

17. The switching converter of claim 16, wherein the discharging or charging of the auxiliary capacitor shifts a voltage on the node from a zero voltage level of the first switch to a zero voltage level of the second switch.

18. The switching converter of claim 16, wherein an auxiliary capacitor circuit is configured to provide the current path to the node by alternatively charging and discharging the capacitor during respective alternating sequential cycles of the periodic switching cycles.

19. The switching converter of claim 16, wherein the current path comprises:
a first switched current path through the capacitor, the inductor and the output during the discharging; and
a second switched current path through the capacitor, the inductor and the input during the charging.

\* \* \* \* \*